Feb. 1, 1955 H. COE 2,700,846

CHANGEABLE FEATURE DOLL

Filed Dec. 13, 1952 4 Sheets-Sheet 1

INVENTOR.
Herring Coe,
BY Paul + Paul
ATTORNEYS.

INVENTOR.
Herring Coe,
BY Paul + Paul
ATTORNEYS.

Feb. 1, 1955 H. COE 2,700,846

CHANGEABLE FEATURE DOLL

Filed Dec. 13, 1952 4 Sheets-Sheet 3

INVENTOR.
Herring Coe,
BY Paul & Paul
ATTORNEYS.

INVENTOR.
Herring Coe,
BY Paul & Paul
ATTORNEYS.

United States Patent Office 2,700,846

Patented Feb. 1, 1955

2,700,846

CHANGEABLE FEATURE DOLL

Herring Coe, Beaumont, Tex.

Application December 13, 1952, Serial No. 325,840

9 Claims. (Cl. 46—120)

This invention relates to dolls. It has for its chief aim, the provision of a doll of which the parts are easily assembled and which can be produced in quantity at small cost; which is sturdy and rugged against easy deformation or destruction incident to rough handling; and which has facilities whereby the head can be moved relative to the body with attendant change in the expression of the face to indicate different moods, such for example, as contentment, tiredness and yawning and/or crying.

Other objects and advantages will appear from the following detailed description of the attached drawings wherein.

Figure 5:
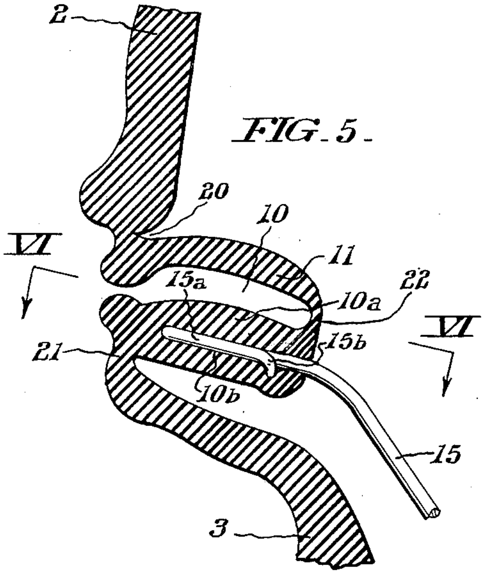
Fig. 5 is a fragmentary vertical detail section through the face of the doll, taken as indicated by the angled arrows V—V in Fig. 1 and drawn to a larger scale.
Figure 8:
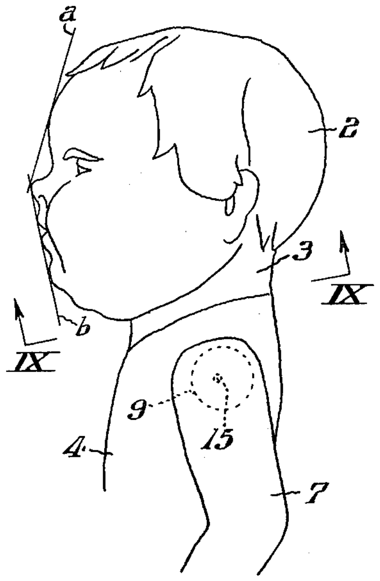
Fig. 8 is a side view of the doll showing the face in normal relaxed condition.
Figure 9:
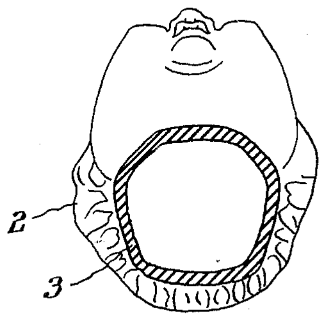
Fig. 9 is a cross sectional view taken as indicated by the angled arrows IX—IX in Fig. 8.
Figure 10:
Fig. 10 shows the normal appearance of the mouth in Figs. 8 and 9.
Figure 11:
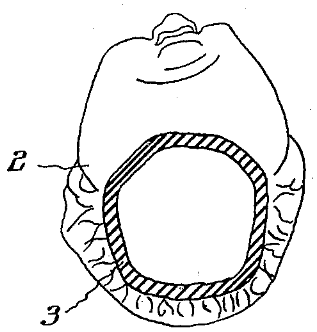
Figs. 11 and 12 are views corresponding to Figs. 9 and 10 showing twist of planes to produce a crooked smile.
Figure 12:

As herein exemplified, the doll of my invention has a body 1 which may be of plastic or other suitable rigid or semi-rigid material, and a hollow elastic head 2 of resilient rubber or the like with an integral neck 3, and with a pendant chest portion 4 engaged downwardly with a snug fit over the upper portion of the body 1 whereto it may be permanently secured by means of a suitable cement. At opposite sides, the pendant chest portion 4 is provided with openings as at 5 for connection of the arms 6 and 7, said arms being formed at their tops with rounded lateral protuberances 6*a* and 7*a* which fit smoothly into lateral socket recesses 8 and 9 in the body 1 at the shoulders. The protuberance 7*a* of arm 7 is made somewhat smaller than that of arm 6 for a reason later explained. From Fig. 5 it will be observed that the head is formed with a mouth cavity 10 which is defined by a horizontal loop-like projection 11 extending inwardly from the face wall, the thickness of the latter being reduced as at 12 in the cheek regions at opposite sides of the mouth for a purpose also hereinafter explained.

Anchored in one end on the upper socketed portion of arm 7 is a lever element 15 which may be conveniently fashioned from stiff stout wire. As shown in Figs. 3–6, this lever element 15 extends upwardly at an angle through the hollow of the neck 3 into the head 2, and its distal end is bent forwardly and fashioned into a flat loop 15*a* which is tightly lodged in a molded pocket 10*b* in the lower wall 10*a* of the mouth cavity, and which is provided with a sharp downturned penetrating terminal projection to insure against its accidental withdrawal. The arms 6 and 7 are being held in assembly by a relatively strong helical spring 17 whereof one end is connected to the lever elements 15 adjacent the socket portion of arm 7, and whereof the other end is secured to an anchorage 18 fixed in the socket portion of the arm 6. In assembling the parts, the loop end 15*a* of the lever element 15 is thrust into the molded pocket 10*b* in lower wall of the mouth and thereafter firmly held in place by the pointed terminal end of said loop as will be readily understood.

Figure 14:
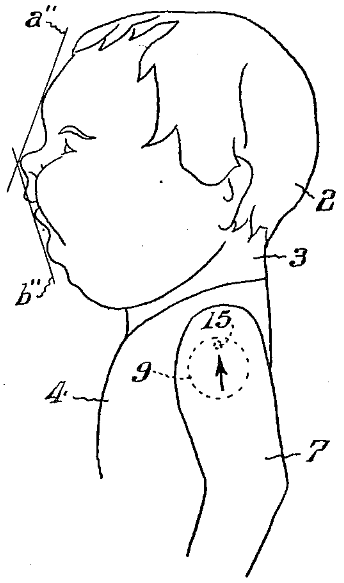
Figs. 13 and 14 are views corresponding to Fig. 8 respectively showing the face vertically elongated and compressed.
Figure 13:
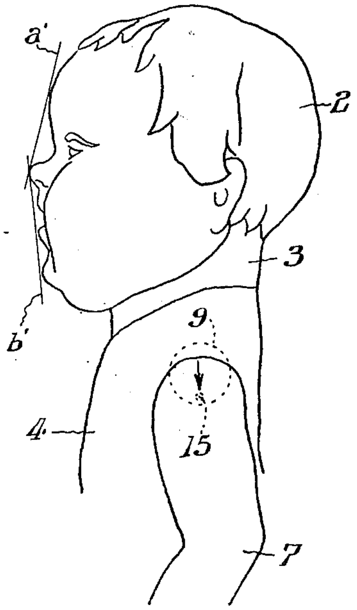
Figure 16:
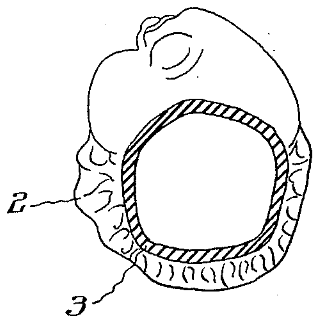
Fig. 16 is a cross section taken as indicated by the angled arrows XVI—XVI in Fig. 15.
Figure 15:
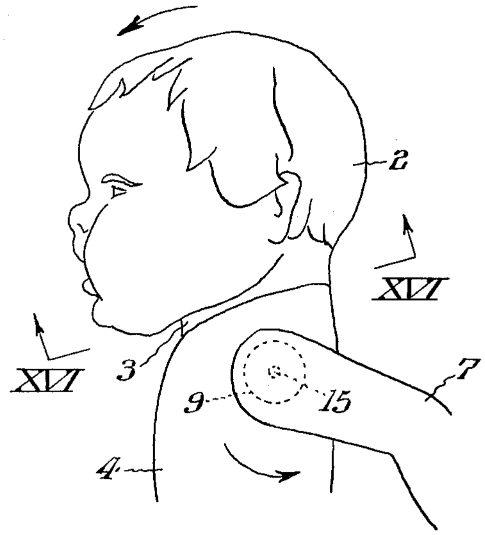
Fig. 15 is a view likewise corresponding to Fig. 8 showing the face with the head slightly lowered to one side and the mouth wide open.
Figure 17:
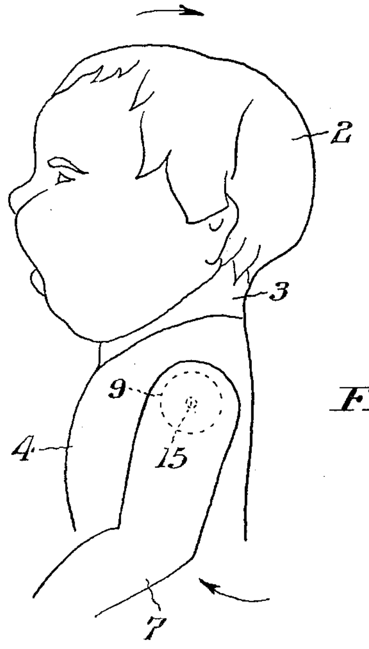
Figs. 17 and 18 are views in turn like Figs. 8 and 10 with the cheeks puffed in a pouting expression and the mouth distorted.
Figure 18:
Figure 19:
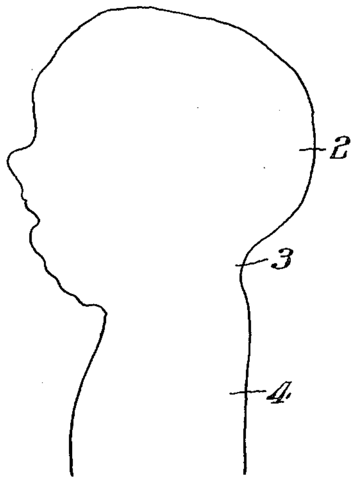
Fig. 19 is a profile outline of the head corresponding to Fig. 17.

Normally, due to the set of the rubber, the face of the doll presents a pleasant expression with the mouth slightly open as in Figs. 1 and 8–10. Through the angular lever element 15, as arm 7 is depressed, the mouth is opened wide with concurrent flexing of the neck 3 and with downward tilting of the head as in Fig. 2. At the same time, the face is somewhat elongated due to the thinning of the cheek walls as at 12 in Fig. 6, with the result that a tired expression simulative of yawning and/or crying is produced. Upon release of arm 7, it is restored to the position of Fig. 1 by relaxation of the rubber of the head and neck so that the doll automatically reassumes its normal pleasant facial expression. By virtue of loose fit of the protuberance 7*a* of arm 7 within its socket in the corresponding shoulder of the body, said arm is accorded greater freedom of movement than the arm 6, and can therefore be pressed inwardly toward the body as well as moved universally in other directions to produce facial expressions other than those illustrated in Figs. 1 and 2, this being made possible through other variations in the thickness of the face portion of the head wall as at 20, 21 and 22 in Fig. 5. By a downward pull upon arm 7 as indicated by the arrow in Fig. 13, the lower lip is projected relative to the upper lip; and the chin is tilted with slight vertical elongation of the head, and with a marked change in the profile of the face from the normal will be readily observed by comparing Fig. 13 with Fig. 8. When the arm 7 is pushed upward as indicated by the arrow in Fig. 14, the cheeks are puffed and the head is vertically compressed. In connection with Figs. 13 and 14, it is to be noted that in the first instance, the front of the face becomes somewhat flattened with the angle $a'$—$b'$ more obtuse than the angle $a$—$b$ in Fig. 8, and in the second instance the angle $a''$—$b''$ is less obtuse than in Fig. 8. When arm 7 is rotated backward and skewed in one direction as in Fig. 15, the head 2 is lowered to one side as in Fig. 16 and the mouth opened wide with attendant twisting of planes and impartation of movement to some facial contours, thereby producing the illusion of life-like facial contortions simulative of yawning. The positions of the nose relative to the mouth and of the lips relative to each other will be here noted as quite different from those shown in Fig. 9. Now, if the arm 7 is rotated forwardly as indicated by the arrow in Fig. 17, the cheeks become puffed and the mouth appears as in Fig. 18, with creation of an expression simulative of pouting. By twisting the arm 7 and at the same time moving it in different ways suggested as above by way of example, still other different facial expressions will result, all such changes being made possible by variations in the thickness of the face wall of the resilient head.

Figures 1, 2, 7:
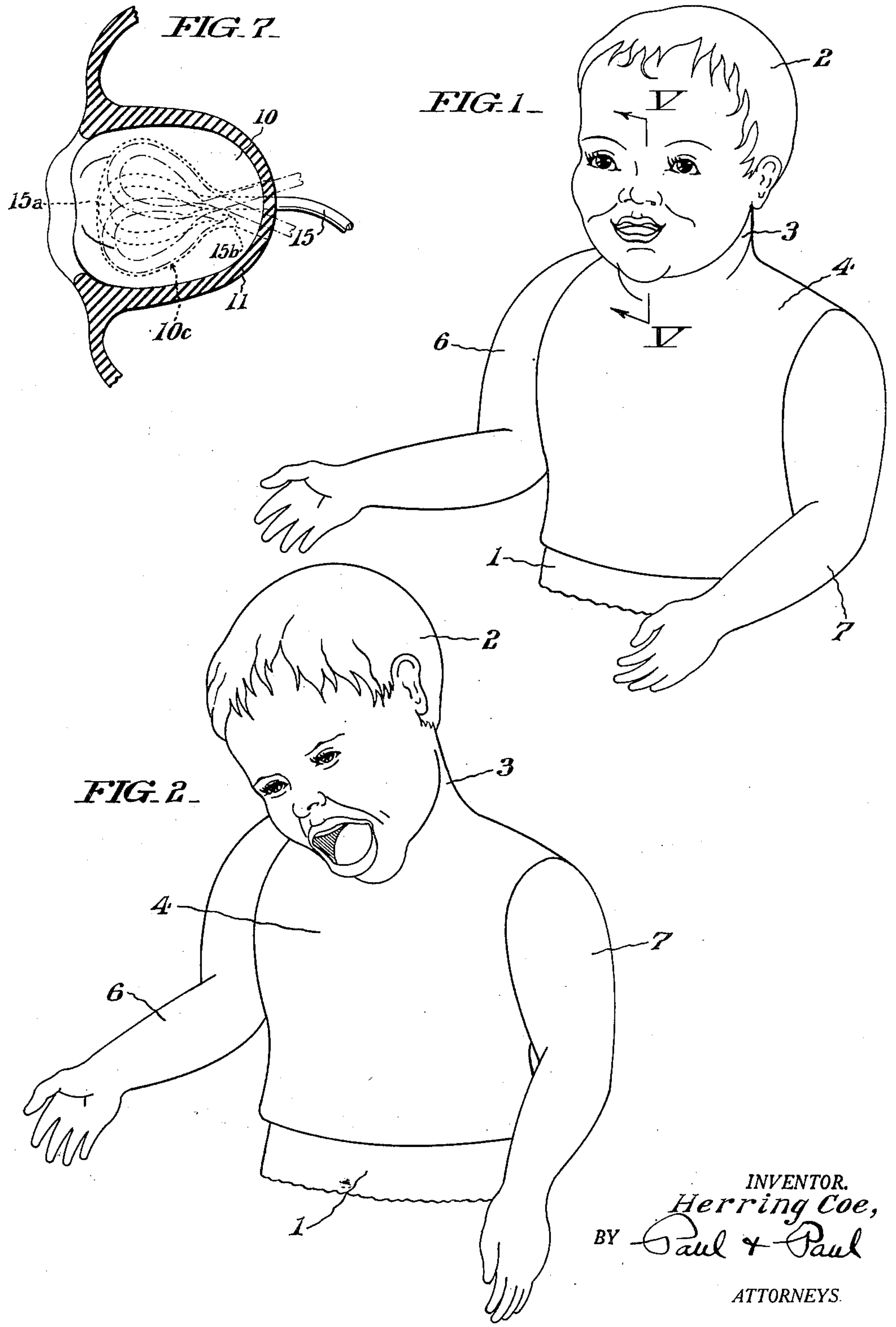
Figs. 1 and 2 are fragmentary perspective views of a doll conveniently embodying my invention, Fig. 1 showing the doll as it normally appears with the lips slightly parted, and Fig. 2 showing the doll with its head bowed to one side and with the mouth wide open.
Fig. 7 is a view similar to Fig. 6, showing a modification.
Figure 3:
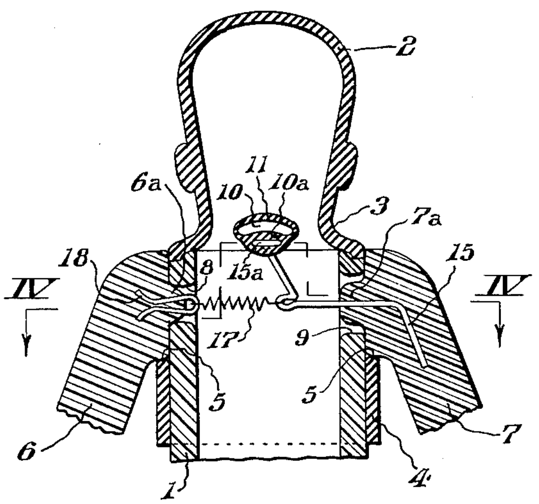
Fig. 3 is a fragmentary view showing the head and the upper body portion of the doll in vertical section, the section being taken in a plane through the shoulders, looking rearwardly.
Figure 4:
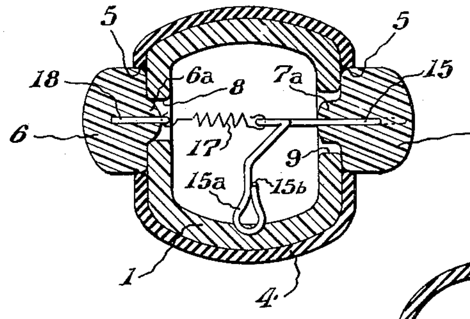
Fig. 4 is a transverse section taken as indicated by the angled arrows IV—IV in Fig. 3.
Figure 6:
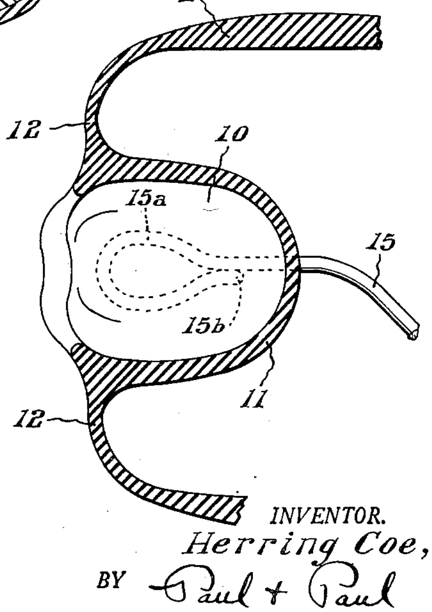
Fig. 6 is a fragmentary horizontal section through the mouth of the doll, taken as indicated by the angled arrows VI—VI in Fig. 5.

In the modification illustrated in Fig. 7, the loop of the lever element is pivoted by the pointed terminal projection at 15b so that it can be shifted horizontally in opposite directions from its normal central position in the widened pocket 10c as indicated in dash and dot lines, by skewing the actuating arm either forwardly or rearwardly before depressing or raising it. Accordingly, when the actuating arm is skewed forwardly or rearwardly and then depressed, the head of the doll will be lowered and correspondingly tilted to one side or the other and the mouth opened awry. On the other hand, when the arm is skewed in either direction as above and then raised, the head will be correspondingly turned slightly and the mouth closed awry as will be readily understood.

It is to be understood that I do not consider myself limited to the precise details of construction or arrangement herein disclosed by way of example, since they are capable obviously of other variations within the scope of the broadest of the appended claims.

Having thus described my invention, I claim:

1. A doll having a body whereof one arm is pivotally connected with capacity for universal movement, to the body at the shoulder, and whereof the head and neck are hollow and of resilient material such as rubber and formed with a mouth cavity which extends inwardly from the face wall portion and of which the lips are slightly parted; and a lever element with one end thereof anchored in the pivot of the arm and extending upward through the neck into the head, the distal end of said lever element being directed forwardly and connected to the lower jaw portion of the head whereby, depending upon the way and direction in which the arm is moved, the mouth is opened or closed and/or skewed concurrently with flexing of the neck and/or change in the position of the head relative to the body.

2. A doll according to claim 1, wherein the face wall portion of the head varies in thickness to permit different expression changes to take place as the arm is moved in the manner aforesaid.

3. A doll according to claim 1, wherein the arm is loosely socketed in the body to permit of its universal movement.

4. A doll according to claim 1, wherein the thickness of the wall of the head is reduced at the cheeks to permit elongation of the face with wide opening of the mouth as the head is lowered by depression of the arm, and compression of the face with tight closing of the mouth when the arm is raised beyond its normal relaxed position.

5. A doll according to claim 1, wherein the arm is socketed into the body at one shoulder; wherein a second arm is similarly socketed into the body at the other shoulder; and wherein a helical tension spring is connected at one end of the lever element adjacent the socketed portion of the first arm, and the other end connected to an anchorage in the socket portion of the second arm.

6. A doll according to claim 1, wherein the body is of rigid material; wherein a second arm is similarly socketed into the arm at the other shoulder; and wherein the head is integrally formed with a chest portion shaped to engage snugly over the upper portion of the body; and wherein said chest portion is provided at opposite sides with openings for connection of the arms to the body.

7. A doll having a body whereof one arm is pivotally connected to the body at the shoulder, and whereof the head and neck are hollow and of rubber or the like and formed with a mouth cavity which extends inwardly of the face wall portion and of which the lips are slightly parted; and a lever element with one end thereof anchored in the pivot of the arm and extending upwardly at an angle through the neck into the head, the distal end of said lever element being directed forwardly and lodged in a preformed molded pocket in the lower wall of the mouth cavity whereby, upon depression of the arm, the mouth is opened wide concurrently with flexing of the neck and with downward bending of the head, and whereby upon raising of the arm beyond its normally relaxed position, the mouth is closed.

8. A doll according to claim 7, wherein the distal end of the lever element is formed into a flat loop; wherein the loop is provided with a pointed projection which penetrates downwardly into the lower wall of the mouth cavity.

9. A doll according to claim 7, wherein the distal end of the lever element is shiftable horizontally in opposite directions from a normal central position within the pocket in the lower wall of the mouth cavity when the arm is skewed forwardly or rearwardly before being depressed or raised, to cause the head to be lowered and turned aside with the mouth wide open and awry in the first instance, and the mouth to be tightly closed and awry in the second instance.

References Cited in the file of this patent

UNITED STATES PATENTS

| | | |
|---|---|---|
| 255,090 | Shepherd et al. | Mar. 14, 1882 |
| 504,627 | Schultz | Sept. 5, 1893 |
| 1,325,986 | Garami et al. | Dec. 23, 1919 |
| 2,101,102 | Schaeffer | Dec. 7, 1937 |
| 2,560,657 | Nogle | July 17, 1951 |